April 22, 1958  G. KLEMT  2,831,395
GAUSSIAN DUAL OBJECTIVE WITH FOUR AIR-SPACED MEMBERS
Filed March 25, 1955
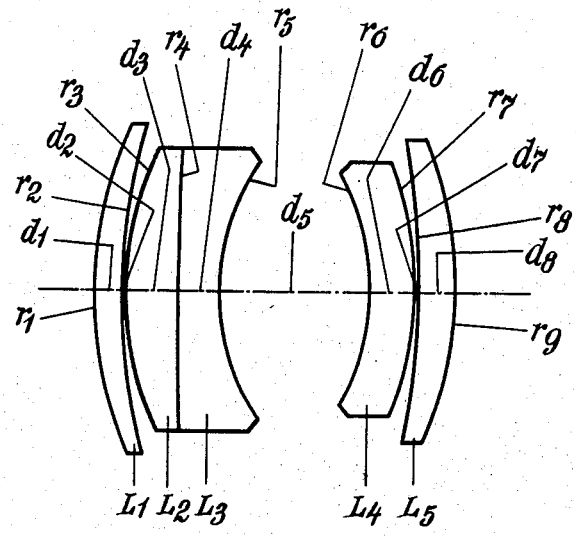
INVENTOR:
Günter Klemt
BY
Karl F. Ror
AGENT

United States Patent Office 2,831,395
Patented Apr. 22, 1958

2,831,395

GAUSSIAN DUAL OBJECTIVE WITH FOUR AIR-SPACED MEMBERS

Günter Klemt, Kreuznach, Germany, assignor to Jos. Schneider & Co., Kreuznach, Germany Application March 25, 1955, Serial No. 496,899

Claims priority, application Germany April 2, 1954

2 Claims. (Cl. 88—57)

The present invention relates to a Gaussian objective of the type having four air-spaced, meniscus-shaped members, including two uncemented, collective outer members bracketing a pair of dispersive inner members facing the diaphragm space with their concave surface, the forward member of this inner pair (i. e. the member positioned on the side of the longer light rays) being provided with a cemented surface.

Such Gaussian dual objectives afford substantial improvement over earlier systems in regard to the general quality of image projection, given proper choice of their parameters (particularly their lens curvatures), especially upon using the more recently available, highly refractive glasses.

The present invention has for its object the provision of an optical system of the character outlined which is thoroughly corrected for spherical, lateral and chromatic aberrations, coma, astigmatism and image curvature.

A feature of the invention resides in the provision of a Gaussian dual objective as defined above wherein the difference between the refractive indices on either side of the cemented surface of the front dispersive member is greater than 0.07 but less than 0.1 (as measured for the yellow helium line of the spectrum), the rear dispersive member has a refractive index greater than 1.71 but less than 1.76, and the lens thickness and air spaces of the system are so dimensioned that the ratio of the system's total physical length to the diameter of the entrance aperture is equal to or smaller than 1.30.

Another feature of the invention resides in such a dimensioning of the radius of the outer curvature of the collective front member that its length is less than 45% but greater than 35% of the overall focal length of the system, the radius of the inner curvature of this front member being at the same time less than 70% but greater than 60% of the overall focal length.

An embodiment of the invention has been illustrated schematically in the sole figure of the accompanying drawing.

The optical system shown in the drawing comprises a collective front meniscus consisting of a single lens $L_1$ having radii $r_1$, $r_2$ and a thickness $d_1$. Spaced from this member by a distance $d_2$ is a dispersive, compound meniscus consisting of a positive forward component $L_2$ having a thickness $d_3$ and radii $r_3$, $r_4$, the latter radius being that of the cemented surface, and a negative rear component $L_3$ having radii $r_4$, $r_5$ and a thickness $d_4$. Separated from this compound member by the diaphragm space of axial length $d_5$ is a dispersive meniscus consisting of a single lens $L_4$ having radii $r_6$, $r_7$ and a thickness $d_6$. Spaced from lens $L_4$ by a distance $d_7$ is a collective meniscus consisting of a single lens $L_5$ having a thickness $d_8$ and radii $r_8$, $r_9$.

Typical numerical values for the parameters of the illustrated system are given, by way of example, in the following table and are to be understood as based upon an overall focal length of numerical value $f=100$, the table also showing the refractive indices $n_d$, the Abbé numbers $\nu_d$ and the diameters D of the several lenses. The relative aperture of the system is 1:3.5, whence the diameter AD of the entrance aperture is found to be 100:3.5=28.5.

| | | D | $n_d$ | $\nu_d$ |
|---|---|---|---|---|
| $L_1$ | $r_1=+\ 38.66$ | | | |
| | | $d_1=\ 2.99$ | 32.5 | 1.74400 | 44.7 |
| | $r_2=+\ 63.45$ | | | |
| | | $d_2=\ 0.13$ | (air space) | | |
| | $r_3=+\ 31.55$ | | | |
| $L_2$ | | $d_3=\ 5.21$ | | 1.72019 | 50.18 |
| | $r_4=+260.59$ | | 28.3 | | |
| $L_3$ | | $d_4=\ 3.91$ | | 1.63980 | 34.6 |
| | $r_5=+\ 21.55$ | | | |
| | | $d_5=14.56$ | (diaphragm space) | | |
| | $r_6=-\ 22.80$ | | | |
| $L_4$ | | $d_6=\ 4.88$ | 25.5 | 1.72825 | 28.3 |
| | $r_7=-\ 32.80$ | | | |
| | | $d_7=\ 0.21$ | (air space) | | |
| | $r_8=-126.61$ | | | |
| $L_5$ | | $d_8=\ 3.91$ | 30.0 | 1.69100 | 54.8 |
| | $r_9=-\ 37.53$ | | | |
| | | [1] 35.80 | | | |

[1] Total physical length TL.

With the foregoing system the ratio of $TL:AD=35.8/28.5$ is 1.25, being thus less than 1.30. Moreover, the radius $r_1$ with a length of 38.66 is greater than $0.35\ f$ but less than $0.45\ f$, while the radius $r_2$ with a length of 63.45 is greater than $0.6\ f$ but less than $0.7\ f$.

Optical systems according to the invention, when compared to known designs of this type of medium-speed objective, can be made of considerably reduced height resulting from a decrease in lens diameters while giving improved performance due, especially, to the removal of residual zonal aberrations.

I claim:

1. An objective system of the Gaussian type, comprising four air-spaced, meniscus-shaped members including an outer pair of simple collective lens members and an inner pair of dispersive members enclosing a diaphragm space, the forward member of said outer pair having an outer curvature with a radius between 35% and 45% of the overall focal length of the system and an inner curvature with a radius between 60% and 70% of said overall focal length, said inner pair consisting of a compound forward lens member and a simple rear lens member, said compound member consisting of a front and a rear lens cemented together and having refractive indices differing by more than 0.07 but less than 0.1 from each other, said rear dispersive member having an index of refraction greater than 1.71 but less than 1.76, the ratio of the sum of the thicknesses and spacings of all of said members to the diameter of the entrance aperture of the system being not greater than 1.30, the ratio between said entrance-aperture diameter and the overall focal length of the system defining a relative aperture of substantially 1:3.5.

2. An objective system according to claim 1, having an overall focal length of numerical value 100, wherein the radii $r_1$, $r_2$ and the thickness $d_1$ of the forward member $L_1$ of said outer pair, the air space $d_2$ between said forward outer member and said compound member, the radii $r_3$, $r_4$ and the thickness $d_3$ of said cemented front lens $L_2$, the radii $r_4$, $r_5$ and the thickness $d_4$ of said cemented rear lens $L_3$, the length $d_5$ of said diaphragm space between said compound member and said dispersive rear member, the radii $r_6$, $r_7$ and the thickness $d_6$ of said dispersive rear member $L_4$, the radii $r_8$, $r_9$ and the thickness $d_8$ of the rear member $L_5$ of said outer pair, the refractive indices $n_d$ of all of said members and the diameters D and Abbé numbers $\nu_d$ thereof have numerical values substantially as given in the following table:

|  |  |  | D | $n_d$ | $\nu_d$ |
|---|---|---|---|---|---|
| $L_1$ | $r_1 = + 38.66$ | $d_1 = 2.99$ | 32.5 | 1.74400 | 44.7 |
|  | $r_2 = + 63.45$ | $d_2 = 0.13$ | (air space) |  |  |
| $L_2$ | $r_3 = + 31.55$ | $d_3 = 5.21$ |  | 1.72019 | 50.18 |
|  | $r_4 = +260.59$ |  | 28.3 |  |  |
| $L_3$ |  | $d_4 = 3.91$ |  | 1.63980 | 34.6 |
|  | $r_5 = + 21.55$ | $d_5 = 14.56$ | (diaphragm space) |  |  |
| $L_4$ | $r_6 = - 22.80$ | $d_6 = 4.88$ | 25.5 | 1.72825 | 28.3 |
|  | $r_7 = - 32.80$ | $d_7 = 0.21$ | (air space) |  |  |
| $L_5$ | $r_8 = -126.61$ | $d_8 = 3.91$ | 30.0 | 1.69100 | 54.8 |
|  | $r_9 = - 37.53$ |  |  |  |  |

References Cited in the file of this patent
UNITED STATES PATENTS

| 583,336 | Rudolph | May 25, 1897 |
| 2,117,252 | Lee | May 10, 1938 |
| 2,171,640 | Berek | Sept. 5, 1939 |
| 2,389,016 | Wynne | Nov. 13, 1945 |
| 2,487,749 | Wynne | Nov. 8, 1949 |
| 2,670,659 | Tronnier | Mar. 2, 1954 |
| 2,672,788 | Brendel | Mar. 23, 1954 |
| 2,683,395 | Klemt et al. | July 13, 1954 |
| 2,683,398 | Klemt et al. | July 13, 1954 |